United States Patent
Brown et al.

(10) Patent No.: US 9,629,063 B2
(45) Date of Patent: Apr. 18, 2017

(54) METHOD AND SYSTEM FOR GLOBAL TOPOLOGY DISCOVERY IN MULTI-HOP AD HOC NETWORKS

(75) Inventors: Thomas A. Brown, Cardiff by the Sea, CA (US); Thomas R. Halford, Manhattan Beach, CA (US); Mark L. Johnson, Poway, CA (US)

(73) Assignee: TrellisWare Technologies, Inc., San Diego, CA (US)

( * ) Notice: Subject to any disclaimer, the term of this patent is extended or adjusted under 35 U.S.C. 154(b) by 85 days.

(21) Appl. No.: 13/467,999

(22) Filed: May 9, 2012

(65) Prior Publication Data

US 2013/0301471 A1    Nov. 14, 2013

(51) Int. Cl.
| | |
|---|---|
| H04L 12/28 | (2006.01) |
| H04W 40/24 | (2009.01) |
| H04W 40/04 | (2009.01) |
| H04W 40/30 | (2009.01) |
| H04W 28/22 | (2009.01) |

(52) U.S. Cl.
CPC .......... *H04W 40/24* (2013.01); *H04W 40/04* (2013.01); *H04W 40/248* (2013.01); *H04W 40/30* (2013.01); *H04W 28/22* (2013.01)

(58) Field of Classification Search
CPC ..... H04W 40/04; H04W 40/10; H04W 40/12; H04W 40/24; H04W 40/248; H04W 28/22; H04W 40/30
USPC ....... 370/235, 238, 254–256, 312, 328, 329, 370/395.3, 395.31, 400, 338, 345, 349
See application file for complete search history.

(56) References Cited

U.S. PATENT DOCUMENTS

| | | | |
|---|---|---|---|
| 5,412,654 A * | 5/1995 | Perkins ........................ | 370/312 |
| 6,904,275 B2 * | 6/2005 | Stanforth ................... | 455/343.1 |
| 7,366,113 B1 | 4/2008 | Chandra et al. | |
| 7,561,024 B2 * | 7/2009 | Rudnick .................. | 340/286.01 |
| 7,860,049 B2 * | 12/2010 | Yagyuu et al. ............... | 370/328 |
| 8,199,677 B1 * | 6/2012 | Amis et al. .................... | 370/255 |
| 2002/0105926 A1 * | 8/2002 | Famolari et al. ............. | 370/331 |
| 2005/0157697 A1 * | 7/2005 | Lee et al. ...................... | 370/349 |
| 2007/0286139 A1 * | 12/2007 | Niu et al. ...................... | 370/338 |
| 2008/0107033 A1 * | 5/2008 | Zhang et al. ................. | 370/238 |

(Continued)

OTHER PUBLICATIONS

Chlamtac, M. Conti, et al, "Mobile ad hoc networking: Imperatives and challenges," Ad Hoc Networks, vol. 1, 2003, pp. 13-64.

(Continued)

*Primary Examiner* — Kwang B Yao
*Assistant Examiner* — Harun Chowdhury
(74) *Attorney, Agent, or Firm* — Kilpatrick Townsend & Stockton LLP

(57) ABSTRACT

Systems and methods are presented for topology discovery in a multi-hop ad hoc network. The method operates on two time and distance scales. Nodes periodically transmit messages to their immediate neighbors that enable the discovery of their two-hop network topologies (i.e., within two hops). Less frequently, nodes broadcast messages network-wide that enable the discovery of the global network topology at all nodes. In multi-hop ad hoc network architectures that are characterized by efficient broadcast protocols—e.g., Barrage Relay Networks—the proposed method provides a particularly efficacious means for global topology discovery.

18 Claims, 4 Drawing Sheets

(56) References Cited

U.S. PATENT DOCUMENTS

| | | | |
|---|---|---|---|
| 2008/0107044 A1 | 5/2008 | Blair et al. | |
| 2008/0159143 A1* | 7/2008 | Nagarajan et al. | 370/235 |
| 2008/0159144 A1* | 7/2008 | Nagarajan et al. | 370/235 |
| 2008/0192724 A1* | 8/2008 | Kondo et al. | 370/345 |
| 2009/0313528 A1 | 12/2009 | Chugg et al. | |
| 2010/0265955 A1* | 10/2010 | Park et al. | 370/400 |

OTHER PUBLICATIONS

Akyildiz, F., Wang, X, et al., "Wireless mesh networks: A survey," Computer Networks, vol. 47, 2005, p. 445-487.

Akyildiz, F., Su, W., et al., "Wireless sensor networks: A survey," Computer Networks, vol. 38, 2002, pp. 393-422.

Halford, T.R., et al., "Barrage Relay Networks," in Proc. UCSD Information Theory and Applications Workshop, La Jolla, CA, 2010, 8 pages.

Bao, L., et al., "A new approach to channel access scheduling for ad hoc networks," in Proc. ACM 7th Annual International Conference on Mobile Computing and Networking, Rome, Jul. 2001, 11 pages.

Jacquet, P., et al., "Optimized link state routing protocol for ad hoc networks," in Proc. IEEE International Multi Topic Conference, Lahore, Pakistan, Dec. 2001, pp. 62-68.

Calinescu, G., "Computing 2-hop neighborhoods in ad hoc wireless networks," in Proc. Second International Conference on Ad Hoc, Mobile, and Wireless Networks (ADHOC-NOW), Montreal, Oct. 2003, pp. 175-186.

* cited by examiner

METHOD AND SYSTEM FOR GLOBAL TOPOLOGY DISCOVERY IN MULTI-HOP AD HOC NETWORKS

FIELD OF THE INVENTION

The present invention relates generally to multi-hop ad hoc wireless networks, and in particular to protocols used to distribute node state information and link state information throughout the network.

BACKGROUND

The use of networks and mobile networks has grown exponentially in recent years. Networks transmit blocks of data between locations on the networks called nodes. Some wireless network architectures, called ad hoc networks, do not have a fixed infrastructure. As such, it is beneficial to maintain regularly updated topology information for the network. Existing protocols for global topology discovery assume that network-wide broadcast in ad hoc wireless networks is inefficient and should be avoided. Accordingly, there is a need for global topology discovery in a manner that can take advantage of efficient network-wide broadcast capabilities of ad hoc wireless network architectures such as Barrage Relay Networks.

SUMMARY

Embodiments of the present invention are directed to methods and systems for global topology discovery in multi-hop ad hoc wireless networks. In one embodiment, nodes periodically transmit their discovered one-hop topology to their neighbors, thereby enabling two-hop topology discovery. Less frequently, nodes broadcast their two-hop topology network-wide, thereby enabling global topology discovery at all nodes.

One embodiment of the present invention relates to a method for discovering global topology in an ad hoc wireless network. The method includes a receiving node receiving a first message on a first logical channel from a first node. The receiving node updates a topology table with a first set of topology information contained in the first message. The receiving node receives a second message comprising a unique identifier on a second logical channel from a second node and determines whether the unique identifier contained in the second message identifies the receiving node. If the unique identifier of the second message does not identify the receiving node, the receiving node receives a third message comprising a second set of topology information on a third logical channel from a third node and updates the topology table with the second set of topology information contained in the third message. However, if the unique identifier of the second message identifies the receiving node, the receiving node transmits a fourth message comprising the topology table on the third logical channel.

Another embodiment of the present invention relates to a method for discovering global topology in an ad hoc wireless network. The method includes a receiving node receiving a first message on a first logical channel from a first node. The receiving node updates a topology table with a first set of topology information contained in the first message and transmits a second message comprising a topology table on a second logical channel. The receiving node then receives a third message including a second set of topology information on the second logical channel from a second node and updates the topology table with the second set of topology information contained in the third message.

These illustrative embodiments are mentioned not to limit or define the limits of the present subject matter, but to provide examples to aid in the understanding thereof. Illustrative embodiments are discussed in the Detailed Description, and further examples are provided there. Advantages offered by various embodiments may be further understood by examining this specification and/or by practicing one or more embodiments of the claimed subject matter.

DETAILED DESCRIPTION

Ad Hoc Wireless Networks

Figure 1:
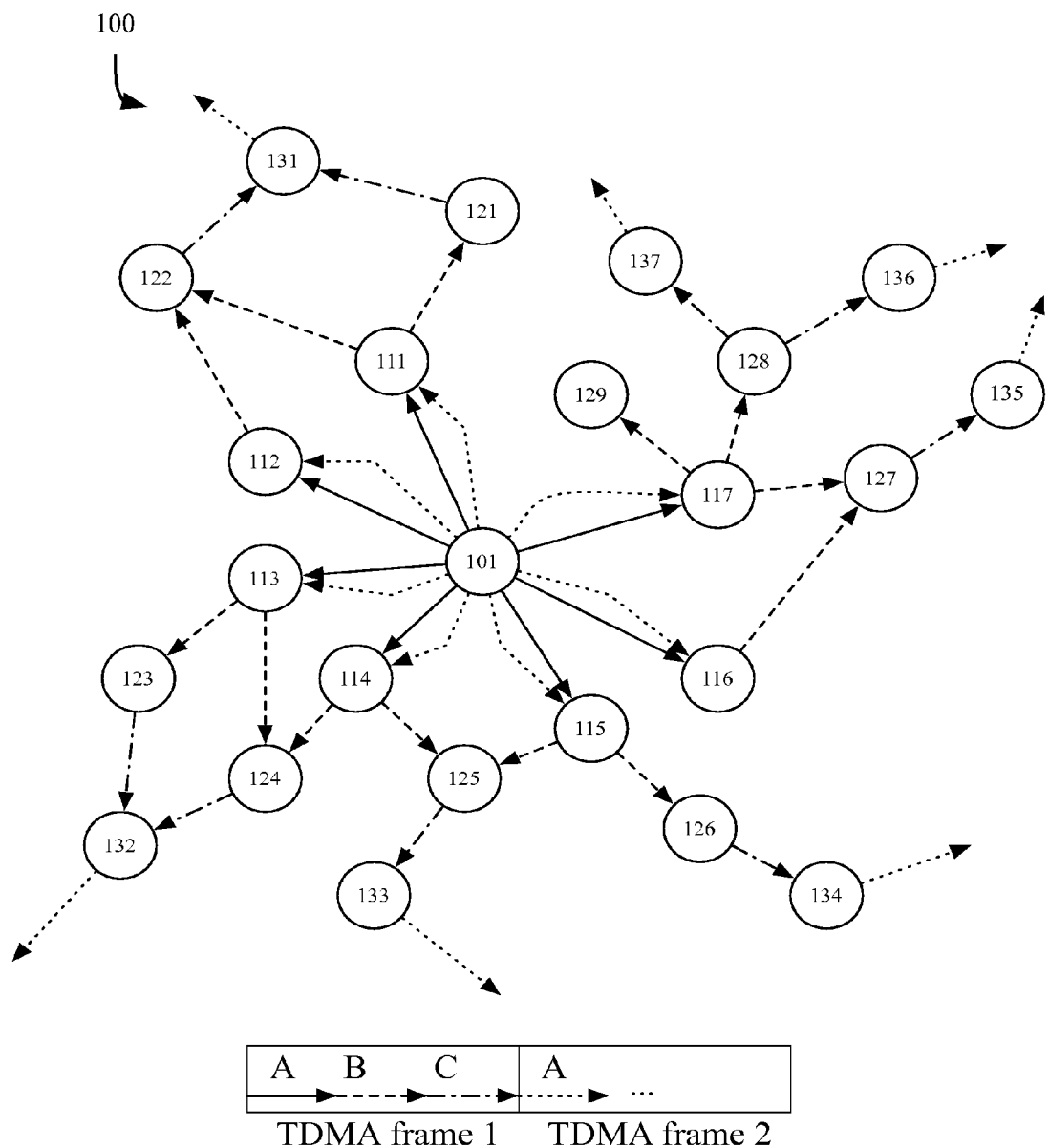
FIG. 1 shows an illustrative broadcast flooding protocol for barrage relay networks, according to one embodiment of the present invention.

Ad hoc wireless networks are the focus of considerable research and development. A number of different classes of ad hoc networks have been identified including:
 (i) mobile ad hoc networks, which are reviewed in I. Chlamtac, et al.'s paper, "Mobile ad hoc networking: Imperatives and challenges," *Ad Hoc Networks*, vol. 1, 2003, pp. 13-64;
 (ii) wireless mesh networks, which are reviewed in I. F. Akyildiz, et al.'s paper, "Wireless mesh networks: A survey," *Computer Networks*, vol. 47, 2005, p. 445-487; and
 (iii) wireless sensor networks, which are reviewed in I. F. Akyildiz, et al.'s paper, "Wireless sensor network: A survey," *Computer Networks*, vol. 38, 2002, pp. 393-422.

Ad hoc wireless networks can be distinguished from other types of wireless networks—such as satellite, cellular, and Wireless Local Area Networks (WLANs)—by a lack of dependence on fixed infrastructure. If a source node wishes to send data to a distinct destination node (or plurality of nodes), but cannot do so via a direct link (due to, for example, a large spatial separation between the source and destination nodes), then a multi-hop communication link can be established through a plurality of intervening nodes that provide a relay function. A key distinguishing feature of ad hoc networks is that at any given time, any given node can act as a source, destination, or relay for any given data transmission.

Network topological information includes, but is not limited to, Node State Information (NSI), such as node location and remaining battery life, and Link State Information (LSI), such as signal-to-noise ratios (SNRs) along the direct wireless links between certain pairs of nodes. NSI may also include information about the data traffic sources operating at a given node. Observe that NSI can be characterized as information about a specific node while LSI concerns pairs of nodes. In the present disclosure, the "one-hop topology" of a given node ("Node X") is defined to include:
(i) the NSI of Node X;
(ii) the NSI of any node for which there exists a direct wireless link to Node X (i.e., the one-hop neighbors of Node X); and
(iii) the LSI of any wireless link involving Node X.

Furthermore, in the present disclosure, the "two-hop topology" of Node X is defined as its one-hop topology in addition to:
(i) the NSI of any node that is not a one-hop neighbor of Node X but for which a wireless link exists to a one-hop neighbor of Node X (i.e., the 2-hop neighbors of Node X); and
(ii) the LSI of any link connecting a one-hop neighbor to a two-hop neighbor of Node X.

Finally, the "global topology" of a network is defined herein as the NSI of all nodes and the LSI between all pairs of nodes that are connected by direct links The global network topology can therefore be viewed as the union of all two-hop topology information. The present invention concerns methods and systems for distributing global topology information to nodes in a network.

Techniques for Two-Hop Topology Discovery

The existence of two-hop network topology information is assumed by many ad hoc wireless networking protocols that operate in a distributed manner. For example, the Node Activation Multiple Access (NAMA) protocol requires that a node know the Unique Identifier (UID) for every node in its two-hop neighborhood so as to make scheduling decisions (i.e., which node transmits when) to avoid collisions. NAMA is described in L. Bao and J. J. Garcia-Luna-Aceves' paper titled, "A new approach to channel access scheduling for ad hoc networks," in *Proc. ACM 7th Annual International Conference on Mobile Computing and Networking*, Rome, July 2001. The Optimized Link State Routing (OLSR) protocol, which was first described in P. Lacquet's paper titled "Optimized link state routing protocol for ad hoc networks," *Proc. IEEE International Multi Topic Conference*, Lahore, Pakistan, December 2001, pp. 62-68, uses 2-hop neighbor information in the definition of multi-hop routes.

While there exist many protocols for two-hop topology discovery protocols (e.g., that described in Calinescu's paper "Computing 2-hop neighborhoods in ad hoc wireless networks," *Proc. Second International Conference on Ad Hoc, Mobile, and Wireless Networks (ADHOC-NOW)*, Montreal, October 2003, pp. 175-186), such protocols typically share common design principles. Messages between adjacent nodes are typically used to ascertain the one-hop topology of every node. For example, a node may broadcast its own NSI to its neighbors. Nodes receiving these messages ascertain the state of the transmitting node as well as the state of the direct wireless link (e.g., the received SNR). Further messages that contain a node's one-hop topology information are then transmitted, thereby distributing two-hop topologies (i.e., since the two-hop topology at a given node is the union of the one-hop topology of all its neighbors).

Techniques for Global Topology Discovery

Existing protocols for global topology discovery typically assume that network-wide broadcast in ad hoc wireless networks is inefficient and should therefore be avoided. That is to say, existing protocols do not leverage the efficient network-wide broadcast capabilities offered by recently proposed ad hoc wireless networking architectures such as Barrage Relay Networks, which are described below.

A representative global topology discovery protocol was described in U.S. Pat. No. 7,366,113, titled "Adaptive topology discovery in communication networks." In this protocol, a specific coordinating node first transmits a topology request message that is propagated throughout the network in a "Diffusion Phase." Nodes ascertain their one-hop topology and distance from the coordinating node (in hops) during this first phase. In a second, "Gathering Phase" of the protocol, nodes transmit topology information to nodes that are closer to the coordinating node in hops. In this manner, a single coordinating node—but not all network nodes—discovers the global topology.

Time-Slotted Barrage Relay Networks

Although the presently disclosed invention can be instantiated in any ad hoc wireless network, it is of practical relevance to ad hoc wireless networks that are designed to provide a rapid network-wide broadcast capability. One such class of ad hoc wireless networks includes Barrage Relay Networks (BRNs). As detailed in Halford and Chugg's paper titled "Barrage Relay Networks," in *Proc. UCSD Information Theory and Applications Workshop*, La Jolla, Calif., 2010, BRNs are distinguished from other wireless networking architectures by their use of an efficient protocol for broadcasting information via a flooding mechanism that exploits cooperative communications at the physical layer. In particular, this cooperative scheme is completely autonomous in that nodes need not coordinate explicitly; rather, cooperative behavior emerges implicitly via intelligent signal design techniques.

In the interest of self-containment, the basic barrage relay mechanism is reviewed presently. FIG. 1 illustrates a small ad hoc wireless network. A common TDMA format is employed by all nodes in which time is divided into frames, which are further divided into M slots per frame (FIG. 1 employs 3 slots per frame labeled "A," "B," and "C"). The value of M is denoted the "spatial pipelining factor." The data transmitted in a given time slot is denoted a "message." Two message that are transmitted by two different nodes are said to be identical if all data—including all protocol header information contained in the respective messages—is identical.

Suppose the central node 101 transmits a message on slot A of the first TDMA frame. All nodes that successfully receive this message are, by definition, one hop away from the source. These nodes are labeled 111, 112, . . . , 117 in FIG. 1. These nodes transmit the same message on slot B, thus relaying to nodes that are 2 hops away from the source (nodes 121, 122, . . . , 129), which in turn transmit the same message on slot C. Nodes that are 3 hops away from the source (nodes 131, 132, . . . , 137) relay the message on slot A of the second TDMA frame. In this way, messages transmit outward from the source via a decode-and-forward approach.

In some embodiments, to prevent the relay transmissions from propagating back towards the source, each node relays a given message only once. For example, one-hop nodes may receive the first broadcast message on slot A (from the source) and again on slot C (from 2-hop nodes), but they only relay on slot B.

Observe that a number of two-hop nodes in FIG. 1 receive the same message from different one-hop nodes during the same time slot. These messages do not collide due to the physical (PHY) layer processing employed by BRNs. Specifically, BRNs employ a PHY layer that allows identical messages to be combined at the receiver in a manner analogous to multipath mitigation in traditional radio receivers. That is to say, the multiple, time-shifted copies of the received signal that arise in BRNs can be interpreted at the receiver as resulting not from different transmitting nodes, but from reflections off, for example, buildings when a single source transmits. One possible method for designing signals that support such combining of identical messages was described in U. S. Patent Application 2006/0981452, "A Method and System for Cooperative Communications with Minimal Coordination."

As explained above, in order for two messages to be identical, both the payload data and all protocol header data must be identical. Therefore, protocol headers in a barrage relay network can only be modified in a manner that is common across all nodes at a given hop distance from the source. For example, a Hop Count (HC) field can be embedded in a protocol header which is incremented upon relay. In this manner, all nodes that receive a message can ascertain their distance (in hops) from the initial message source node. Moreover, in some embodiments, an HC field can also be combined with a time-to-live (TTL) field in order to limit the extent of a transmission in a BRN.

Observe that the spatial reuse of time slots enables messages to be pipelined to the source for transmission every three slots. Specifically, in FIG. 1, the one-hop nodes will not receive the message broadcast by the three-hop nodes during slot A of the second TDMA frame. Thus, the source can safely transmit a second message during that slot. In this manner, a throughput of W/3 can be achieved for broadcast in a single-source BRN (W is the capacity of a single point-to-point link). We denote this efficient injection of messages for transmission "spatial pipelining" in order to highlight its reuse of time slots between spatially separated nodes.

More generally, spatial pipelining can be achieved by having a source node inject a new message for barrage relay broadcast every M slots resulting in a throughput of W/M. It is readily seen that for arbitrary networks (i.e., where the size of the network is unknown to the source a priori), M must be at least 3 to avoid collisions. Larger spatial pipelining factors may be chosen in order to enhance robustness in highly mobile network topologies.

Because time-slotted BRNs employ a common TDMA frame format at all nodes, the time slots that comprise a given frame can be allocated to different network services. For example, certain slots may be devoted to the transmission of data and other slots to push-to-talk (PTT) voice messages. The slots comprising a single service form a TDMA Logical Channel (LC). In this case, the basic barrage relay protocol described above operates on a single LC. A message received in a time slot assigned to a given LC is relayed on the next time slot that is assigned to that same LC.

Although the present invention is defined without regard to the specific class of ad hoc wireless network in which it is instantiated, the invention is discussed in the context of exemplary time-slotted Barrage Relay Network (BRN) systems.

Globally Coordinated Global Topology Discovery

In one embodiment of the present invention, a system operates on three Logical Channels:
(i) the Two-hop topology Exchange Logical Channel (TE-LC)
(ii) the Global topology Polling Logical Channel (GP-LC); and,
(iii) the Global topology Response Logical Channel (GR-LC).

All messages on the TE-LC are transmitted with a time-to-live (TTL) of one hop (i.e., messages are not relayed on the TE-LC). All messages on the GP-LC and GR-LC are broadcast network-wide via the barrage relay mechanism described above.

Every node maintains a topology table containing its current estimate of its two-hop topology and the global network topology. Messages transmitted on the TE-LC are used to update the local topology as described in further detail below. The present invention is described without regard to the specific protocol used to coordinate access to the TE-LC. In one embodiment of the invention, nodes transmit messages on the TE-LC with a fixed probability p so that collisions between different messages can occur. In another embodiment of the invention, the transmission probability at a given node is determined as a non-increasing function of the size its one-hop neighborhood so as to decrease the probability of collision. In yet another embodiment of the invention, collisions are suppressed by using a contention access method such as the Node Activation Multiple Access (NAMA) protocol described in Bao and Garcia-Luna-Aceves' paper titled "A new approach to channel access scheduling for ad hoc networks," in *Proc. ACM 7th Annual International Conference on Mobile Computing and Networking*, Rome, July 2001.

A given node, "Node X," transmits a topology exchange message on the TE-LC containing:
(i) its own Node State Information (NSI);
(ii) the NSI of all of its one-hop neighbors (as ascertained from its topology table); and,
(iii) the LSI of any wireless link involving Node X (as ascertained from its topology table).

Upon receiving this message on the TE-LC, a neighboring node of Node X, "Node Y," updates its topology table as follows:
(i) the NSI of Node X is updated in the topology table at Node Y to be that contained in the message from Node X;
(ii) the NSI of all one-hop neighbors of Node X, except for Node Y itself, is updated in the topology table at Node Y to be that contained in the message from Node X;
(iii) the LSI of all links involving Node X, except that between Nodes X and Y, is updated in the topology table at Node Y to be that contained in the message from Node X; and
(iv) the LSI of the wireless link between Nodes X and Y is updated according to the received statistics of the message received at Node Y (e.g., the SNR).

In this manner, two-hop topology information is maintained at all nodes.

In one embodiment of the invention, time stamps are paired with the NSI and LSI records. For example, if a topology exchange message is received at time T, then the NSI of Node X in the topology table of Node Y as well as the LSI of the wireless link between Nodes X and Y would be time-stamped with that value T. The time stamps of the NSI and LSI information contained in the one-hop topology information of Node X would be time-stamped on a per-entry basis (depending on the time of the actual NSI or LSI measurement). When such time stamps are included in NSI and LSI records, the topology updates described above can be altered so that an NSI or LSI record can only be replaced by more recent measurements.

In an embodiment of the invention, a pre-assigned Coordination Node periodically broadcasts a message on the GP-LC containing a Unique Identifier (UID) for the node, "Node P," that is to transmit the next message (or messages) on the GR-LC. In one embodiment of the invention, the entire local topology table at Node P is transmitted in as many spatially pipelined messages as required to contain the entire local topology table at Node P (as explained in the time-slotted BRN section above). In another embodiment of the invention, only a portion of the local topology table is transmitted in a single message on the GR-LC (where the specific portion of the local topology table that is transmitted may be chosen at random or deterministically).

In one embodiment, the Coordination Node chooses a UID of a node (or polls a node) at random. In another embodiment, the Coordination Node chooses a UID of a node according to the state of its current global topology table. For example, if a given node, Node X, was recently polled, then polling a neighbor within one-hop of Node X will not give as much new NSI and LSI information as polling a node that is more than 2 hops from Node X.

Figure 2:
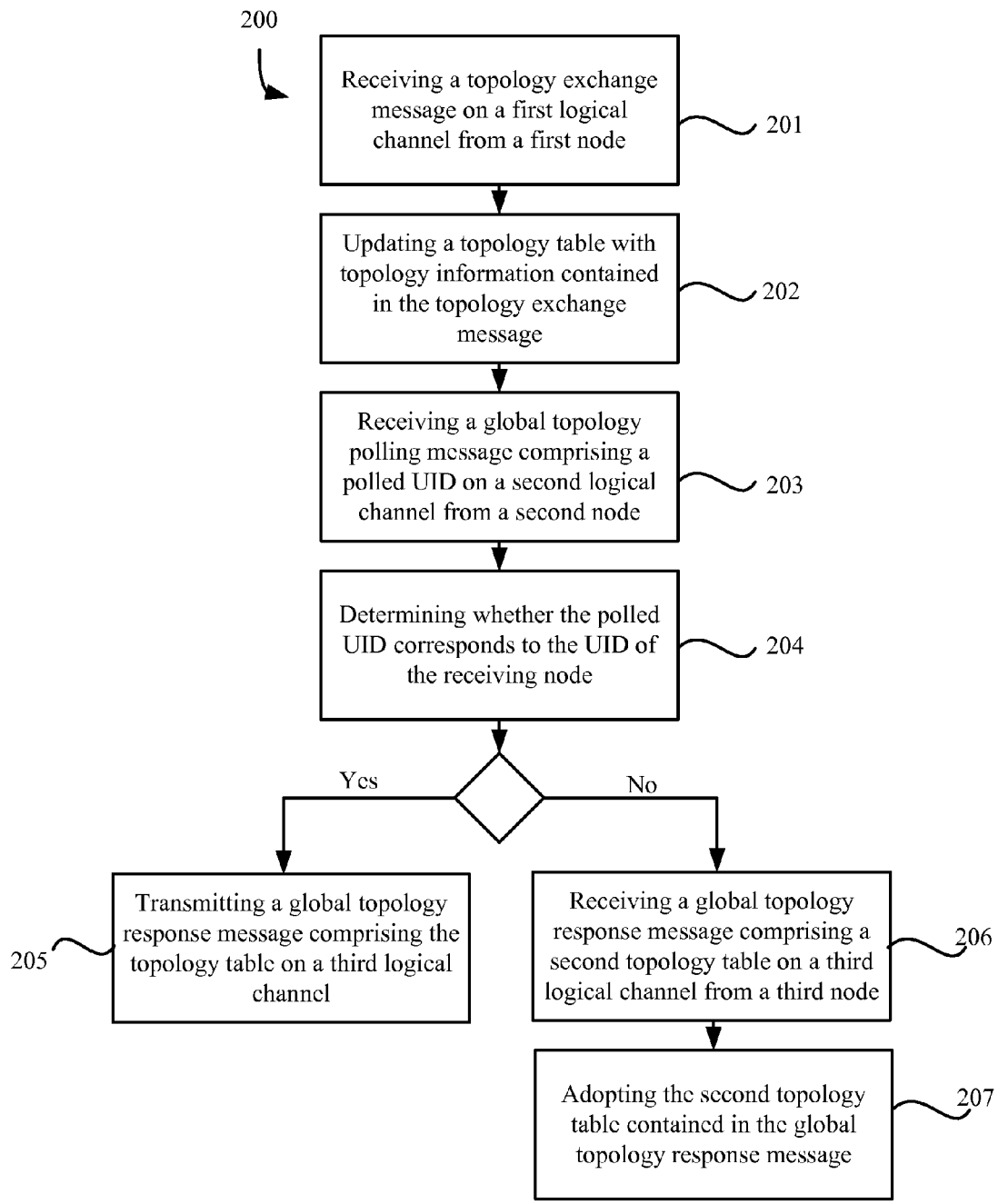
FIG. 2 is a flow chart for a method for coordinated global topology discovery in multi-hop ad hoc wireless networks, according to one embodiment of the present invention.

FIG. 2 is a flow chart for a method 200 for coordinated global topology discovery in multi-hop ad hoc wireless networks, according to one embodiment of the present invention.

In step 201, a node receives a topology exchange message on a first logical channel from a first node. The first logical channel may be a two-hop topology exchange logical channel (TE-LC) as described above. Additionally, the topology exchange message may have a TTL field set to one hop and thus will not be relayed by a receiving node. The topology exchange message may comprise NSI information of the first node including node location and battery life condition as well as NSI information of the one-hop neighbors of the first node. Additionally, the topology exchange message may comprise the LSI of any wireless link involving the first node. This information is maintained in a topology table of the first node. Every node may maintain a topology table containing that node's current estimate of its two-hop topology, and the global network topology. When transmitting a topology exchange message, a node will use the data in its local topology table to ascertain the information included in the topology exchange message.

In step 202, the receiving node updates its local topology table with the topology information contained in the topology exchange message. The topology information may include all of the NSI and LSI information included in the topology exchange message or only certain NSI and LSI information. Furthermore, the topology information may include other data, such as a time stamp of when a particular NSI or LSI measurement was made. According to this time stamp, the receiving node may or may not update the current information in its topology table. For example, if the receiving node receives a topology exchange message with a node's NSI that was measured prior to the current NSI value for that node in the topology table, the receiving node may not update that NSI entry in its topology table.

In step 203, the receiving node receives a global topology polling message comprising a UID (polled UID) on a second logical channel from a second node. The global polling message is transmitted network wide so that the receiving node may relay the message to its neighboring nodes. Each node in the network has a different UID, and each node's topology table may maintain the UID of each node in the network. The global topology polling message provides a polled UID that corresponds to a node in the network such that one of the nodes will recognize that the global topology polling message is directed to that node. The message may not have a time-to-live field so that it is relayed network wide so that all nodes on the network receive the global topology polling message. The second node may be a pre-assigned coordination node.

In step 204, the receiving node determines whether the polled UID corresponds to the UID of the receiving node. The polled UID is received from a coordination node that informs the nodes on the network which node should transmit the next global topology response message. Accordingly, only one node may be identified by the polled UID in a global topology polling message. Thus, the receiving node compares the polled UID to its own UID to determine if it is being instructed to transmit a global response message including its local topology table. The coordination node may be pre-assigned and may determine which UID to include by any suitable process. For example, the determination may be made randomly or based on the condition of the coordination node's local topology table. For example, the coordination node may determine that a particular node has not been polled recently by analyzing its local topology table. Furthermore, the coordination node may determine that the NSI or LSI at a particular node is outdated by looking at the measurement time stamp of when the NSI or LSI measurement was taken. Accordingly, the coordination node may decide to poll that node in order to update all of the network nodes with more recent measurement data.

In step 205, the receiving node determines that the global polling node message is requesting that the receiving node respond because the polled UID matches the receiving node's UID. Accordingly, the receiving node generates and transmits a global topology response message that may comprise its local topology table on a third logical channel. The third logical channel may be dedicated to messages of this sort and may be referred to as a global topology response logical channel (GR-LC). The receiving node may include its full topology table or portions of its topology table. Furthermore, if only portions are sent, these portions may be determined according to predetermined rules or determined randomly. For example, in some embodiments, a receiving node that is identified in a global topology polling message may be instructed in the message as to what portion of the topology table to provide. For instance, in some embodiments, the message could inform the receiving node to only include recent measurements, or could inform the receiving node of what NSI and LSI information to include from the topology table. Additionally, the local topology table may be sent over multiple messages if the data is too large to fit in one message. Each of these messages would be sent on the next GR-LC time slot.

If the polled UID does not correspond to the receiving node's UID, the receiving node determines that the global topology polling message is requesting that a different node respond to the polling message. In step 206, the receiving node receives a global topology response message. The global topology response message comprises a local topology table on the third logical channel (GR-LC) from a third node. This message is the same as the global topology response message described above but is generated and transmitted by a different node in the network having a UID matching the polled UID.

Finally, in step 207, the receiving node may update its local topology table based on the information transmitted from the third node. The receiving node may also relay the global topology response message to its neighboring nodes if the global topology response message does not have a time-to-live parameter limiting extent of transmission.

Distributed Global Topology Discovery

In some operational scenarios, it may be impractical to assign a specific Coordination Node. In this case, the poll/response mechanism described above can be replaced by a random access protocol that operates on a single Global Topology Broadcast Logical Channel (GB-LC). In one embodiment of the invention, a given broadcast node, "Node B," transmits a message (or a spatially pipelined plurality of messages) on the GB-LC. The message contains its local topology table. The message is transmitted with probability q so that collisions between messages from different nodes could occur on the GB-LC. When a message is received by a neighboring node, the node updates their local topology table as described above.

Figure 3:
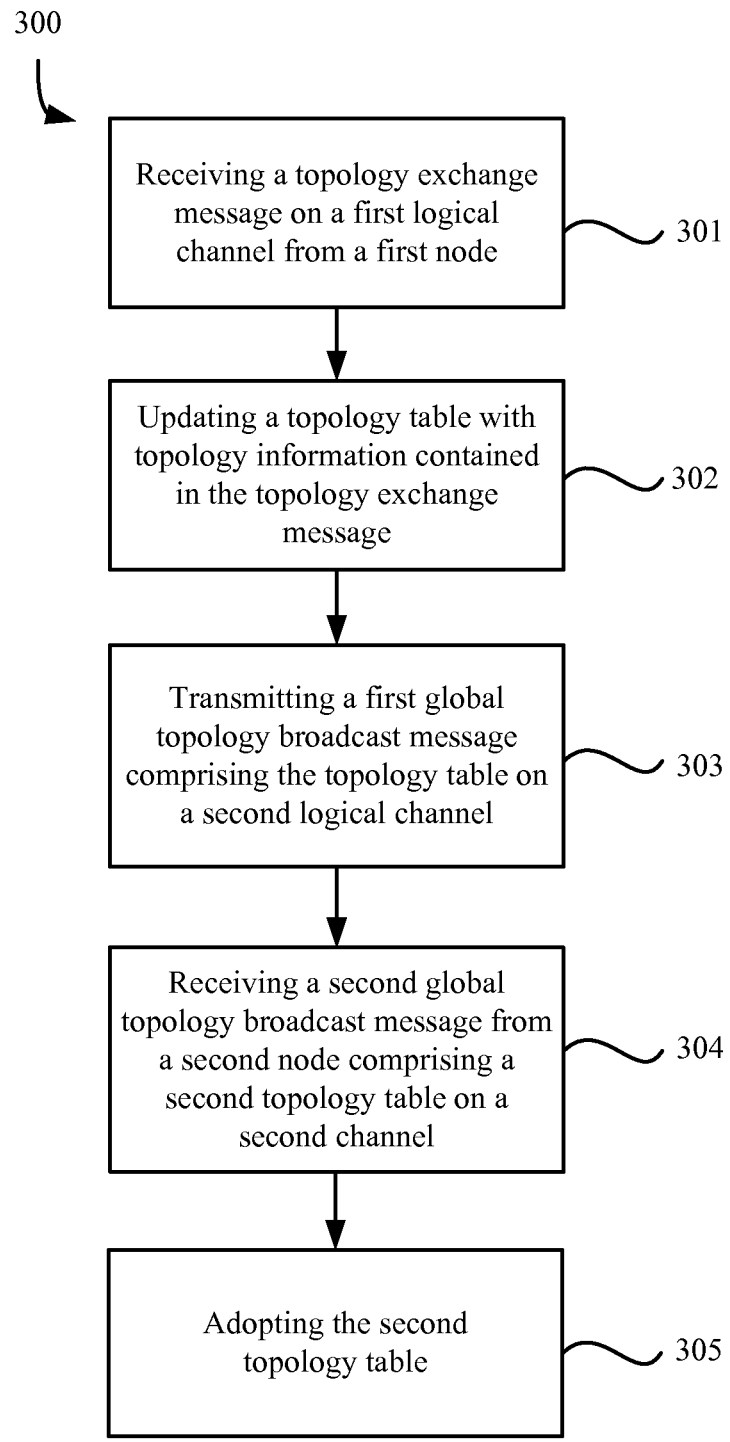
FIG. 3 is a flow chart for a method for distributed global topology discovery in multi-hop ad hoc wireless networks, according to one embodiment of the present invention.

FIG. 3 is a flow chart for a method 300 for distributed global topology discovery in multi-hop ad hoc wireless networks, according to one embodiment of the present invention. In this embodiment, the pre-assigned coordination node described in reference to FIG. 2 above is replaced by a random access protocol that operates on a single Global topology Broadcast Logical Channel (GB-LC).

In step 301, a receiving node receives a topology exchange message on a first logical channel from a first node. This step may operate similarly to the step of receiving a topology exchange message as explained above in reference to FIG. 2.

In step 302, the receiving node updates a topology table with topology information contained in the topology exchange message. This step may operate similarly to the step of updating a topology table as explained above in reference to FIG. 2.

However unlike FIG. 2 above, in step 303, the receiving node transmits a first global topology broadcast message comprising the receiving node's local topology table on a second logical channel with a predetermined probability. The second logical channel may be a global topology broadcast logical channel and may be dedicated to the global topology broadcast messages.

In step 304, the receiving node receives a second global topology broadcast message from a second node comprising a second topology table on the second channel. The receiving node receives the second global topology broadcast message when the probability of transmitting a global topology broadcast message is such that a message is not broadcast and thus the logical channel is available.

Finally, in step 305, adopting the second topology table as the global topology table at the receiving node. The adoption step may be similar to the adoption step described above in FIG. 2.

In another embodiment of the invention, a distributed collision-avoidance access control protocol is employed on the GB-LC. Let $$f(t,u):Z^+ \times Z^+ \rightarrow Z^+ \quad (1)$$

define a function that maps a positive integer-valued time slot, $t \in Z^+$, and a positive integer-valued UID, $u \in Z^+$ to the set of positive integers $Z^+$. When the GB-LC ceases to be used by another node, every node computes the value of f(t,u) for itself and all other nodes in the network at that time slot (using information from their respective topology tables). If all nodes in the network share a common list of node UIDs, then a single node, "Node W," will determine that its UID yields the largest (or smallest) value of f(t,u) on that time slot. Node W then transmits a message (or a spatially pipelined plurality of messages) on the GB-LC that contains its local topology table.

Figure 4:
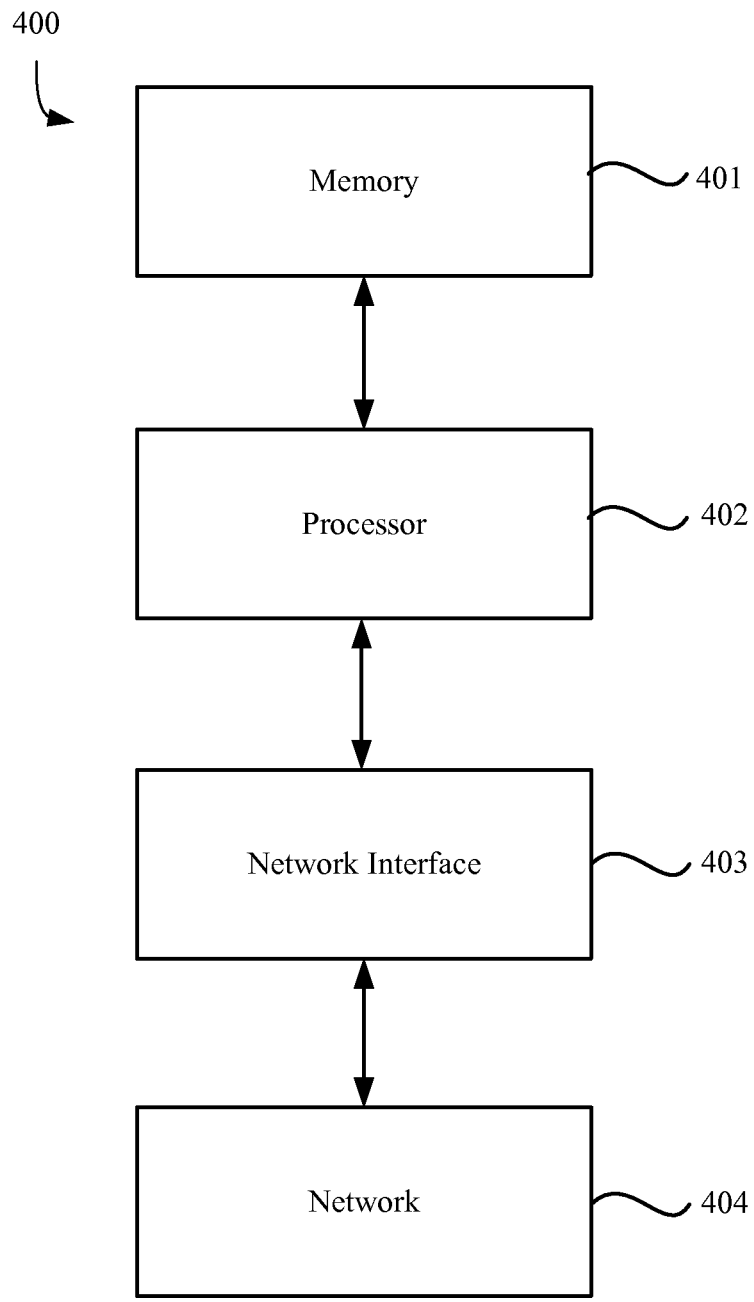
FIG. 4 is a block diagram of a system for distributed global topology discovery in a multi-hop ad hoc wireless network, according to one embodiment of the present invention.

FIG. 4 is a block diagram of a device implementing a method of global topology discovery according to one embodiment of the present invention. As shown in FIG. 4, the system 400 comprises a memory 401, a processor 402, a network interface 403, and a network 404.

The processor 402 is configured to execute computer-executable program instructions stored in memory 401. For example, processor 402 may execute one or more computer programs for global topology discovery in time slotted barrage relay networks in accordance with embodiments of the present invention. Processor 402 may comprise a microprocessor, a digital signal processor (DSP), an application-specific integrated circuit (ASIC), one or more field programmable gate arrays (FPGAs), state machines, or the like. Processor 402 may further comprise a programmable electronic device such as a programmable logic controller (PLC), a programmable interrupt controller (PIC), a programmable logic device (PLD), a programmable read-only memory (PROM), an electronically programmable read-only memory (EPROM or EEPROM), or other similar devices.

Memory 401 comprises a computer-readable medium that stores instructions that when executed by processor 402, cause processor 402 to perform various steps, such as those described herein. Examples of computer-readable media include, but are not limited to, an electronic, optical, magnetic, or other storage or transmission devices capable of providing processor 402 with computer-readable instructions. Other examples of computer-readable media comprise, but are not limited to, a floppy disk, CD-ROM, magnetic disk, memory chip, ROM, RAM, ASIC, configured processor, all optical media, all magnetic tape or other magnetic media, or any other medium from which a computer processor can access data. In addition, various other devices may include computer-readable media such as a router, private or public network, or other transmission devices. The processor 402 and the processing described may be in one or more structures, and may be dispersed throughout one or more structures.

Processor 402 is in communication with the network interface 403. The network interface 403 may comprise one or more network connections. Network interface 403 connects processor 401 to network 404. Network 404 may be one of many types of networks known in the art. For example, network 404 may comprise a wired or wireless network, such as a BRN.

General Considerations

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor.

While the present subject matter will be described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A method of discovering global topology in a barrage relay network comprising:
 receiving, at a receiving node, a first message on a first logical channel from a first node;
 updating, at the receiving node, a topology table with a first set of topology information contained in the first message;
 receiving, at the receiving node, a second message on a second logical channel from a second node, the second logical channel being different from the first logical channel, the second message being periodically broadcast network wide by the second node, the second message comprising a unique identifier associated with a node in the barrage relay network and a request to transmit local topology information, the unique identifier identifying the node as a destination of the second message;
 determining, at the receiving node, whether the unique identifier identifies the receiving node; and
 when the unique identifier does not identify the receiving node:
  receiving, at the receiving node, a third message comprising a second set of topology information on a third logical channel from a third node and updating the topology table with the second set of topology information contained in the third message, the third logical channel being different from the first logical channel and the second logical channel, the third message being a response to the request to transmit local topology information, and the third message being a spatially-pipelined broadcast through the barrage relay network;
 when the unique identifier identifies the receiving node:
  transmitting, from the receiving node, a fourth message comprising the topology table on the third logical channel, the fourth message being a response to the request to transmit local topology information, and the fourth message being another spatially-pipelined broadcast through the barrage relay network.

2. The method of claim 1, Wherein the first message is a topology exchange message and the first logical channel is a topology exchange logical channel.

3. The method of claim 2, wherein the topology exchange message comprises:
 node state information for the first node;
 node state information for all one-hop neighboring nodes of the first node; and
 link state information for all links between the first node and the one-hop neighboring nodes of the first node.

4. The method of claim 1, wherein the second message is a global topology polling message, the second logical channel is a global topology polling logical channel, and the second node is a pre-assigned coordination node.

5. The method of claim 4, wherein the unique identifier included in the global topology polling message is determined by the pre-assigned coordination node randomly.

6. The method of claim 4, wherein the unique identifier included in the global topology polling message is determined by the pre-assigned coordination node according to the state of the global topology table of the pre-assigned coordination node.

7. The method of claim 1, wherein the third message is a global topology response message, and the third logical channel is a global topology response logical channel.

8. The method of claim 1, wherein the first set of topology information is two-hop topology information.

9. The method of claim 1, wherein the second set of topology information is a global topology.

10. The method of claim 1, wherein the first message comprises a time to live of one hop.

11. The method of claim 1, Wherein topology information comprises node state information providing information about a specific node and link state information providing information about links between pairs of nodes.

12. The method of claim 11, wherein the step of updating the topology table with the first set of topology information further comprises:
 updating node state information of the first node in the topology table to the node state information for the first node included in the first set of topology information;
 updating node state information of all one-hop neighboring nodes of the first node included in the first set of topology information except for the receiving node;
 updating link state information of all links between first node and the neighboring nodes included in the first set of topology information except for the link between the first node and the receiving node; and
 updating the link state information of the link between the first node and the receiving node with statistics of the first message determined by the receiving node.

13. The method of claim 12, wherein the step of updating the topology table with the first set of topology information further comprises saving a time stamp with each of the node state information entries and the link state information entries in the topology table corresponding to when the node state information and the link state information was measured.

14. The method of claim 13, wherein the receiving node only updates the topology table with node state information entries and link state information entries in the first set of topology information if the time stamp for each node state information entries and link state information entries is more recent than the time stamp of the current node state information entries and link state information entries in the topology table.

15. A non-transitory tangible computer-readable medium embodying program code executable by a computing system, the program code comprising:
 program code for receiving, at a receiving node in a barrage relay network, a first message on a first logical channel from a first node;
 program code for updating, at the receiving node, a topology table with a first set of topology information contained in the first message;
 program code for receiving, at the receiving node, a second message on a second logical channel from a second node in the barrage relay network., the second logical channel being different from the first logical channel, the second message being periodically broadcast network wide by the second node, the second message comprising a unique identifier associated with a node in the barrage relay network and a request to transmit local topology information, the unique identifier identifying the node as a destination of the second message;

program code for determining, at the receiving node, whether the unique identifier identifies the receiving node, wherein when the unique identifier does not identify the receiving node, program code for receiving, at the receiving node, a third message comprising a second set of topology information on a third logical channel from a third node in the barrage relay network and updating the topology table with the second set of topology information contained in the third message, the third logical channel being different from the first logical channel and the second logical channel, the third message being a response to the request to transmit local topology information, and the third message being a spatially-pipelined broadcast through the barrage relay network; and wherein when the unique identifier identifies the receiving node, program code for transmitting, from the receiving node, a fourth message comprising the topology table on a third logical channel, the fourth message being a response to the request to transmit local topology information, and the fourth message being another spatially-pipelined broadcast through the barrage relay network.

16. The non-transitory tangible computer-readable medium of claim 15, wherein the first message is a topology exchange message and the first logical channel is a topology exchange logical channel.

17. The non-transitory tangible computer-readable medium of claim 15, wherein the second message is a global topology polling message, the second logical channel is a global topology polling logical channel, and the second node is a pre-assigned coordination node.

18. The non-transitory tangible computer-readable medium of claim 15, wherein the third message is a global topology response message, and the third logical channel is a global topology response logical channel.

* * * * *